Jan. 13, 1959  J. A. NEUWORTH ET AL  2,868,916
SIGNALLING DEVICE FOR AUTOMOTIVE VEHICLES
Filed Jan. 5, 1956
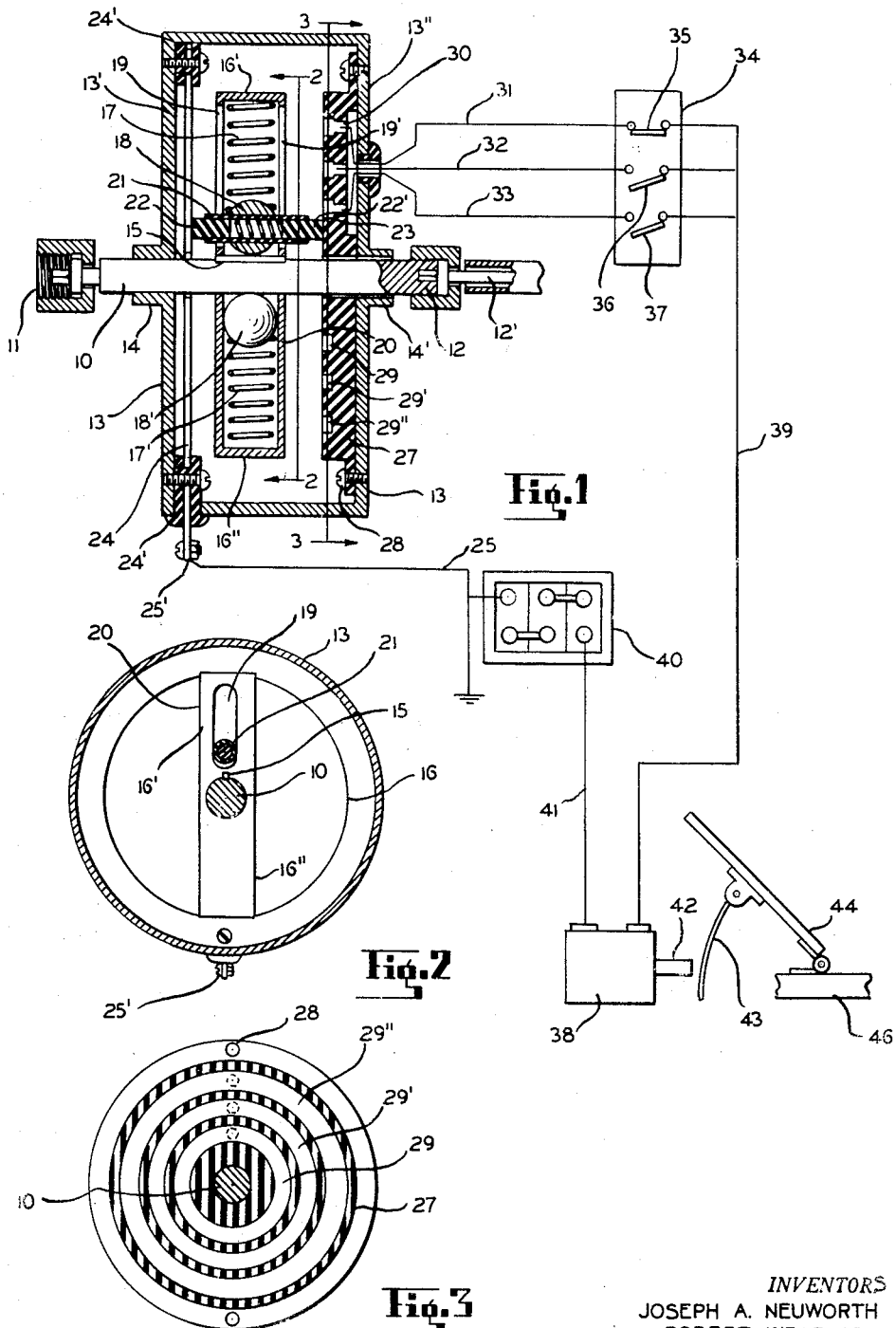
INVENTORS
JOSEPH A. NEUWORTH
ROBERT WEARING
BY
PARKER & CARTER
ATTORNEYS 2,868,916

SIGNALLING DEVICE FOR AUTOMOTIVE VEHICLES

Joseph A. Neuworth and Robert H. Wearing, Milwaukee, Wis.

Application January 5, 1956, Serial No. 557,591

3 Claims. (Cl. 200—80)

Our invention relates to an automotive signalling device and more particularly to a device that will signal the operator when the vehicle has reached a pre-determined speed.

It is manifest to anyone familiar with driving an automotive vehicle, such as an automobile or truck, that it is imperative to observe the speed laws, and as these laws vary in the various municipalities and locations on the highway or streets, it is possible that the driver while watching traffic is often unable to observe the speedometer dial.

The prime purpose and object of our invention is to provide an automatic signalling device that may be easily set at a speed corresponding with the permitted speed of the particular section of the highway being travelled. When the speed has been attained the device will attract the attention of the operator, either by successive impacts on the accelerator, or by means of a light or buzzer.

A further object of our invention is to provide a device that may be constructed as an accessory for insertion in the speedometer cable line, or made a part of the original installation independently of the speedometer.

Other and further objects of our invention will become more apparent as the description proceeds, when taken in conjunction with the drawings, in which:

Figure 1 is a digrammatic view of the entire unit and the electrical system thereof, with the governor and contact units shown in cross-section.

Figure 2 is a front view of the governor taken on line 2—2 of Figure 1, and

Figure 3 is a cross-section of the governor taken on line 3—3 of Figure 1.

Referring now to details of the embodiment of our invention shown in the drawings, the character 10 indicates a shaft connected at one end 11 so as to be driven from a part of the vehicle transmission which is responsive to the speed of the vehicle, such cable leading from the transmission in the manner of a conventional speedometer cable. The other end 12' of shaft 10 may be attached to an extension 12' of the speedometer cable which leads to the speedometer. Thus the device as shown is designed to be placed anywhere within the speedometer cable leading from the transmission to the speedometer on the dash of the vehicle, although it will be understood that the device could also be located in any other convenient location on the vehicle, and operated independently of the speedometer.

A circular housing 13 has bearings 14 and 14' in opposed end faces 13' and 13", in which the shaft 10 is journalled. A governor unit assembly is enclosed in the housing 13, and is keyed at 15 on the shaft 10. This governor unit consists of a circular member 16, having a pair of opposed cylindrical, radially extending guide units 16', 16" enclosing compression springs 17 and 17'. The outer ends of said springs abut the outer ends of guide units 16' and 16" and their inner ends abut slidable weights, herein consisting of spherical balls 18 and 18'.

One guide unit 16' has opposed longitudinal slots 19, 19' through its side walls. The ball 18 in said slotted guide unit supports a transversely disposed tubular member 21, made of non-conducting material, having its ends extending outward in guiding relation through the slots 19, 19'. Said member forms a slidable support for a pair of brushes 22 and 22' projecting beyond said member. The brushes are yieldingly urged outwardly by a compression spring 23 so that one brush 22 frictionally engages a circular contact plate 24, mounted by insulated supports 24' in one end of the housing 13. A wire 25 is attached at 25' to the contact plate 24.

The other brush 22' frictionally engages an intermittent contact plate assembly, consisting of a disc 27 made of a non-conducting material, which disc is fastened to the inner face of the end wall 13" by screws 28, or in any other convenient manner. Said disc has a plurality of concentric, separated contact rings 29, 29', 29" imbedded in, and flush with its inner face. These contact rings have projecting members 30 extending through the disc 27, for connection with wires 31, 32 and 33, passing through and insulated from the adjacent end wall 13" of the housing.

Figure 1 shows a switch panel 34, supporting a plurality of switches 35, 36 and 37 which have similar sides connected, respectively, to the contact rings 29, 29' and 29" in the disc 27, by the wires 31, 32 and 33. Obviously any number of switches may be employed, corresponding in number with the contact rings imbedded in the disc 27. The switch panel 34 may be located at any convenient place, as for instance on the dash of the vehicle, with each of the switches designated by a specific speed. The several switches are connected at their other sides to a magnetic solenoid 38 by a wire 39. The contact plate 24 is connected to a battery 40 by the wire 25, and the solenoid 38 is connected to the battery 40 by a wire 41.

The solenoid 38 is employed to actuate a signalling device to warn the operator when the speed of travel to which the switch means is set, is being exceeded. In the preferred form shown herein, said signalling device consists of a plunger 42, slidably supported for vibratory motion by the solenoid 38, and arranged for engagement with a lever 43 attached as usual to the accelerator pedal 44 hingedly attached to the floor board 45 of the vehicle.

From the above description it will be understood that the device operates in the following manner:

One of the switches 35, 36 and 37 is closed, for example, the switch 35, to provide a setting for a predetermined speed to be signalled. The shaft 10 may be connected at one end 11 to the transmission or to a cable leading from the transmission so as to be rotated in response to the speed of the vehicle. If the device is to be used in the speedometer cable line, the other end 12 of shaft 10 is connected to the speedometer cable 12' leading to the speedometer on the dash of the vehicle. As the shaft 10 is rotated governor member 16 is also rotated, and the resulting centrifugal force will cause the balls 18 and 18' to move outward against the tension of the springs 17 and 17'. The brushes 22 and 22' move with the ball 18, causing the brush 22' to be moved along the face of the disc 27 for engagement with one of the circular rings 29, 29' and 29" (as shown in Figure 1, the outermost ring 29") while the brush 22 is in continuous engagement with the circular contact plate 24. Thus when the brush 22' reaches the particular ring connected to any closed switch, it will complete the circuit through the wires 25, 39 and 41, causing the solenoid to actuate the plunger 42 for engagement with the lever 43 with a vibratory motion, as a signal to the operator, whose foot rests on the accelerator 44 while driving the vehicle, that he has reached the predetermined speed set by the closed switch.

The solenoid 38 may also be used to actuate a signal light, or a buzzer as a warning signal for the operator.

Although we have shown and described certain embodiments of the invention, it will be understood that various changes and modifications may be without departing from the spirit and scope of the invention as defined in the appended claims.

We claim:

1. In a device for indicating a predetermined speed of an automotive vehicle, a governor assembly having a housing, a rotatable governor member journalled in said housing adapted for driving connection with a vehicle part responsive to the speed of the vehicle, an electrical contact plate mounted in and insulated from said housing and disposed in a plane perpendicular to the axis of said rotatable governor member, an insulating disc mounted on the opposite side of said governor member in a plane parallel to said contact plate, said governor member having a pair of opposed radially extending guide units thereon each having weight members yieldably mounted therein for outward movement in response to the centrifugal force caused by rotation of said governor member, one of said weight members having two brushes yieldably mounted thereon and projecting toward opposite sides thereof for engaging said contact plate and said insulating disc respectively, said brushes being electrically connected together and insulated from said governor member, said insulating disc having a plurality of concentric, radially spaced contact rings imbedden in and flush with its inner face, a plurality of switches each electrically connected on one side with one of said contact rings, the switches, insulating disc, brushes and contact plate being adapted for connection to an electric circuit means connecting the opposite sides of said switches and the contact plate in said governor assembly, thereby to selectively energize the assembly at a speed predetermined by selective closing of said switches.

2. The device of claim 1, wherein the brushes carried by one of the weight members are mounted in the opposite ends of an insulated tube projecting transversely through said weight member, and a coil compression spring is disposed in said tube engaging the inner ends of said brushes to provide the electrical connection between said brushes.

3. The structure of claim 2, wherein the guide units on the governor member consist of tubular members closed at their outer ends, the weight members are slidably mounted in said guide units with coil compression springs in said guide members between said weight members and the outer ends of said guide units, and one of said guide units has slots along opposite sides thereof for guiding the ends of the insulated tube in which the brushes are mounted.

References Cited in the file of this patent

UNITED STATES PATENTS

| | | |
|---|---|---|
| 1,485,197 | O'Keefe | Feb. 26, 1924 |
| 2,185,329 | Caldwell | Jan. 2, 1940 |
| 2,251,623 | Crofoot et al. | Aug. 5, 1941 |
| 2,452,344 | Addorisio | Oct. 26, 1948 |

FOREIGN PATENTS

| | | |
|---|---|---|
| 37,572 | France | Sept. 23, 1930 |